United States Patent [19]

Fulcher, Jr. et al.

[11] Patent Number: 5,023,832

[45] Date of Patent: Jun. 11, 1991

[54] METHOD OF MAINTAINING ASYNCHRONOUS REAL-TIME DATA

[75] Inventors: Leonard S. Fulcher, Jr., Peoria; Richard R. Galbraith, Tempe, both of Ariz.

[73] Assignee: Honeywell Inc., Minneapolis, Minn.

[21] Appl. No.: 295,962

[22] Filed: Jan. 12, 1989

[51] Int. Cl.⁵ .................... G06F 15/46; G06F 15/74
[52] U.S. Cl. ............................ 364/900; 364/920; 364/921.5; 364/962.1; 364/945.3
[58] Field of Search ............... 364/200, 300, 900, 500, 364/513, 550, 139

[56] References Cited

U.S. PATENT DOCUMENTS

| | | |
|---|---|---|
| 4,536,837 | 8/1985 | Olson et al. |
| 4,769,771 | 9/1988 | Lippmann et al. ............... 364/200 |
| 4,819,159 | 4/1989 | Shipley et al. ................... 364/200 |
| 4,831,582 | 5/1989 | Miller et al. ..................... 364/900 |
| 4,907,167 | 3/1990 | Skeirik ............................. 364/500 |

OTHER PUBLICATIONS

An Introduction to Data Base Systems, vol. 1, C. J. Date, 1986, pp. 3, 415, 434, 462.
Encyclopedia of Computer Science, Ralston, 1976, pp. 187–188, 1003–1011, 1198–1208, 1442, 432.

*Primary Examiner*—Thomas M. Heckler
*Assistant Examiner*—John Loomis
*Attorney, Agent, or Firm*—A. A. Sapelli; D. J. Lenkszus; A. Medved

[57] ABSTRACT

A process control system has a network which includes a plurality of modules, each module performing a predetermined function. The modules include at least one history module, and at least one application module, the modules being linked via a medium such that each module can communicate with every other module of the network. The network interfaces with a control subsystem which interfaces with control elements of a plant process, the control elements having associated therewith process data. The process data includes data values and event data; the total data includes process data, data calculated from the process data, off-line data, and external data, the total data being stored in a storage device of the history module. A method for maintaining the total data comprises the steps of queuing messages requesting selected portions of the total data to be stored in said storage device. The next step is processing the messages to determine if a new record is to be written in the storage device, and if a new record is to be written, proceeding to the next step; otherwise, skip to the updating step. The next step is that of writing the new record in a next available adjacent record of the storage device, and then repeating the processing, beginning with the queuing step. In the updating step, the record requested via the message is updated with the selected portions of the total data as specified by the message. Finally, the processing is repeated beginning at the step of queuing.

9 Claims, 5 Drawing Sheets

METHOD OF MAINTAINING ASYNCHRONOUS REAL-TIME DATA

BACKGROUND OF THE INVENTION

This invention relates to a method of data base management, and more particularly, to a method of maintaining a data base wherein the data being collected and stored is obtained on an asynchronous, real-time basis.

In a process control environment, a process control system controls a process, eg, a continuously operating manufacturing plant. At different points, or stations, along the process, there is available a data element, or variable, which can be measured and/or controlled. These data elements include pressure, flow, temperature, calculated values which may include some of the aforementioned data elements (i.e. is a function of these data elements). . . . The process control system has the ability to collect and store these data elements. In previous process control systems, these data elements were collected on a cyclic basis and stored in a structured array having values $a_i, b_i, c_i, \ldots$ where a, b, c, . . . are predefined data elements, and i is an index, in the cyclic system being a function of time f(t), where $1 \leq i \leq n$, n being as large as permitted by the data storage device (i.e., the memory device of the process control system). In these previous systems (i.e., cyclic systems), the time interval between each value of the index i is fixed. Thus, if the frequency of data collection was once per minute, the time interval between each data package $(a_i, b_i, c_i, \ldots)$, sometimes referred to herein as a snapshot) is one minute. Therefore, the time interval between $a_i$ and $a_{i+1}$ is one minute. Thus, these previous systems maintained a sequence of images of the process at these fixed interval of times (i.e., cyclic). The process control system could readily perform the trending of a variable as a function of time i.e., provide a plot of a variable as a function of time. However, the data values of the data elements of these present day systems include analog values, and did not include information, such as, on-off, open-closed, automatic-manual, . . . information. Further, if the time interval (i.e., the frequency) of the collection was changed, all the data previously collected was, for all practical purposes, no longer relevant. If the data base structure was changed, again for all practical purposes, the data prior to the change in structure was no longer relevant. These present day systems did not readily provide for forwarding. In order to determine when an event occurred, a sequential search has to be performed—a very tedious process.

Thus there is a need to provide a data base system and a method for maintaining the data base, where some of the data is occurring asynchronously on a real-time basis, and other data associated with the real-time data can be generated sometime later. The present invention provides a method of collecting and storing the real-time, asynchronous data which allows for providing trending information, and for collecting other data indicating events, . . . event histories, and provides the information to perform statistical analysis of the data on an on-line basis.

SUMMARY OF THE INVENTION

Therefore, there is provided by the present invention, a method for collecting and storing data of a process, the data occurring on a real-time asynchronous basis, the data stored being readily accessible for permitting event histories and statistical analysis to be performed thereon. In a process control system, there is included a network which includes a plurality of modules, each module performing a predetermined function. The modules include at least one history module, and at least one application module, the modules being linked via a medium such that each module can communicate with every other module of the network. The network interfaces with a control subsystem which interfaces with control elements of a plant process, the control elements having associated therewith process data. The process data includes data values and event data; the total data includes process data, data calculated from the process data, off-line data and external data, the total data being stored in a storage device of the history module. A method for maintaining the total data comprises the steps of queuing messages requesting selected portions of the total data to be stored in said storage device. The next step is processing the messages to determine if a new record is to be written in the storage device, and if a new record is to be written, proceeding to the next step; otherwise, skip to the updating step. The next step is that of writing the new record in a next available adjacent record of the storage device, and then repeating the processing, beginning with the queuing step. In the updating step, the record requested via the message is updated with the selected portions of the total data as specified by the message. Finally, the processing is repeated beginning at the step of queuing.

Accordingly, it is an object of the present invention to provide a method for maintaining data of a process.

It is another object of the present invention to provide a method for storing and collecting data of a process, the data of the process occurring on a real-time, asynchronous basis.

It is still another object of the present invention to provide a method for storing and collecting data of a process, the data of the process occurring on a real-time, asynchronous basis, whereby the data is readily accessible to perform predefined operations on the data.

It is still a further object of the present invention to provide a method for storing and collecting data of a process, the data of the process occurring on a real-time, asynchronous basis, whereby the data is readily accessible to perform event histories and statistical analysis on the stored data in a timely manner.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 5, shows an overall flow diagram of the control logic of a central software program, referred to herein as a storage manager module.

DETAILED DESCRIPTION

Figure 1:
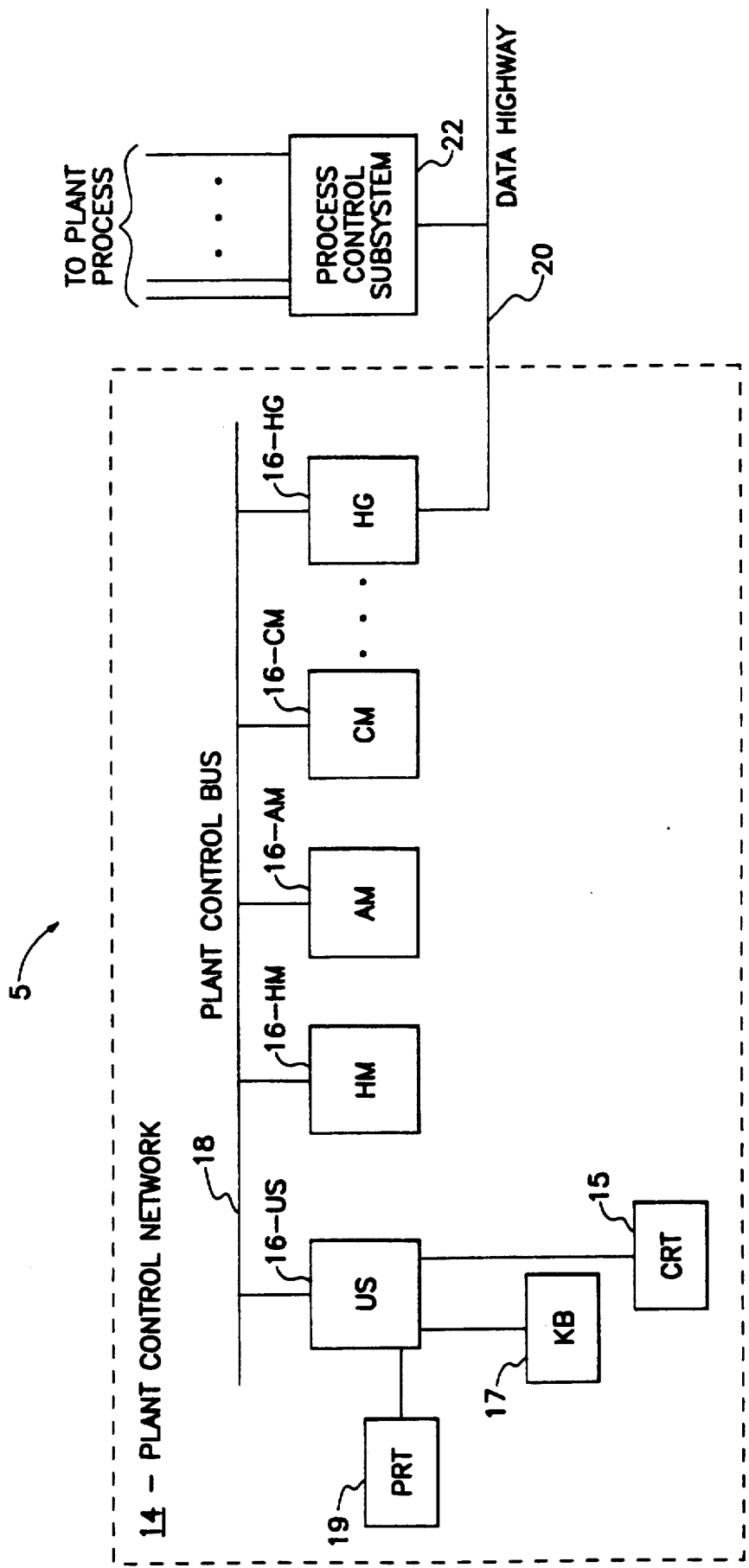
FIG. 1 shows a block diagram of a process control system in which the method of the present invention can be utilized.

Before a detailed description of the method of the present invention is given, it will be useful to describe the overall system in which the method of the present invention can be utilized. Referring to FIG. 1, there is shown a block diagram of a process control system 5 (or more simply control system or system) in which the method of the present invention can be utilized. The organization, or architecture, of the system 5 includes a plant control network 14 (or more simply referred to herein as network), a token passing distributed local area network (LAN); however, it will be obvious to those skilled in the art that the network and system can have alternative configurations and is not limited to the architecture of FIG. 1.

Physical modules 16 of network 14 of the preferred embodiment are of various specialized functional types, as will be described hereinunder. Each physical module 16 is the peer, or equivalent, of the other in terms of right of access to the network's communication medium, or plant control bus 18, for the purpose of transmitting data to other modules 16 of network 14. Highway gateway module 16-HG provides communications and data translation facilities between plant control bus 18 and data highway 20 associated with a process control subsystem 22, which is a distributed digital process control and data acquisition subsystem.

The process control subsystem 22 is, in the preferred embodiment, a Honeywell Inc. TDC 2000 process control system, a description of which is found in a Honeywell publication entitled, "Basic Systems TDC 2000 System Summary SY-02-02", dated June 1981, 12 pages.

Universal operator station module (US) 16-US of network 14 is a work station for one or more plant operators. It includes an operator console which is the interface between the plant operator, or operators, and the process or processes of the plant for which they are responsible. Each universal operator station module 16-US, is connected to plant control bus 18, and all communications between the universal operator station module 16-US, and any other module 16 of network 14, is via the plant control bus 18. Universal operator station module 16-US has access to data that is on plant control bus 18 and the resources and data available through, or from, any of the other modules 16 of network 14. The universal station module 16-US includes a cathode ray tube display (CRT) 15 which includes a video display generator, an operator keyboard (KB) 17, a printer (PRT) 19, and can also include (but not shown) a floppy disk data storage device, trend pen recorders, and status displays, for example.

A history module (HM) 16-HM provides mass data storage capability. The history module 16-HM includes at least one conventional disk mass storage device such as a Winchester disk, which disk storage device provides a large volume of nonvolatile storage capability for binary data. The types of data stored by such a mass storage device are typically trend histories, event histories, ... or data from which such histories can be determined, data that constitutes or forms CRT type displays, copies of programs for modules 16 . . . .

An application module (AM) 16-AM provides additional data processing capability in support of the process control functions performed by the controllers associated with the process control subsystem, such as data acquisition, alarming, batch history collection, and provide continuous control computational facilities when needed. The data processing capability of the application module 16-AM is provided by a processor (not shown) and a memory (not shown) associated with the module.

Computer module (CM) 16-CM uses the standard or common units of all physical modules 16 to permit a medium-to-large scale, general purpose data processing system to communicate with other modules 16 of network 14 and the units of such modules over plant control bus 18 and the units of process control subsystems 22 via the highway gateway module 16-HG. Data processing systems of a computer module 16-CM are used to provide supervisory, optimization, generalized user program preparation and execution of such programs in higher level program languages. Typically, the data processing systems of a computer module 16-CM have the capability of communicating with other such systems by a communication processor and communication lines.

Plant control bus 18 (or more simply bus 18) is a high-speed, bit serial, dual redundant communication bus that interconnects all the modules 16 of plant control network 14. Bus 18 provides the only data transfer path between the principal sources of data, such as highway gateway module 16-HG, application module 16-AM, and history module 16-HM, and principal users of such data, such as universal operator station module 16-US, computer module 16-CM, and application module 16-AM. Bus 18 also provides the communication medium over which large blocks of data, such as memory images, can be moved from one module 16, such as history module 16-HM to universal station module 16-US. Bus 18 is dual redundant in that it consists of two coaxial cables that permit the serial transmission of binary signals over both at a rate of five megabits per second.

In the preferred embodiment, modules 16 have been provided with redundant or backup modules, but have been omitted in order to simplify the drawings and description. Each type of module 16 is comprised of hardware devices which are physically packaged together and designed to support a particular set of functions. The unit of redundancy in the network 14 is the physical module 16. A redundant, secondary, or backup, module 16 must be of the same type as its primary module so that both will have the same complement of hardware units. It will be understood by those skilled in the art that each type of module 16 of the network 14 is capable of having one or more backups.

Figure 2:
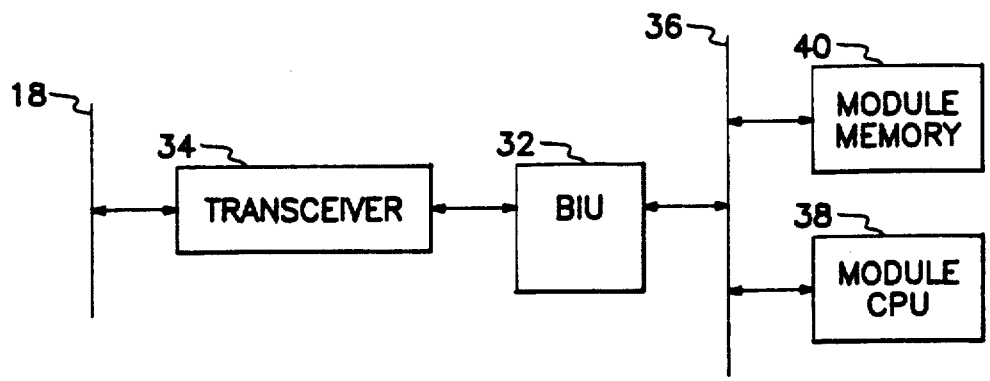
FIG. 2 shows a schematic block diagram illustrating the common elements of each physical module of the plant control network of the system.

Referring to FIG. 2, there is shown a block diagram of the common elements of each physical module of the network 14 of the system 5. Each of modules 16 includes a module central processor unit 38 and a module memory 40, a random-access memory, and such additional controller devices, or units, which are configured to provide the desired functionality of that type of module, i.e., that of the operator station 16-US, for example. The data-processing capabilities of each module's CPU 38 and module memory 40 create a distributed processing environment which provides for improved reliability and performance of network 14 and plant management system 5. The reliability of network 14 and system 5 is improved because, if one module 16 of network 14 fails, the other modules 16 will remain operational. As a result, network 14 as a whole is not disabled by such an occurrence as would be the case in centralized systems. Performance is improved by this distributed environment in that throughput and fast operator response times result from the increase computer processing resources, and the concurrency and parallelism of the data-processing capabilities of the system.

Each module 16 has a bus interface unit, BIU, 32 which is connected to the plant control bus 18 by a transceiver 34. Each module 16 is also provided with a module bus 36 which, in the preferred embodiment, is capable of transmitting 16 bits of data in parallel, a module CPU 38 and a module memory 40. Other units, utilized to tailor each type of module 16 to satisfy its functional requirements, are operatively connected to module bus 36 so that each such unit can communicate with the other units of a module 16 via its module bus 36. The BIU 32 of the module 16 that has the token at any given time is enabled to transmit data on, or over, bus 18. In the preferred embodiment, all transmissions by a BIU 32 are transmitted over the coaxial cables which form the bus 18. A more detailed description of the control system 5 can be had by referring to U.S. Pat. No. 4,607,256, entitled "PLANT MANAGEMENT SYSTEM", assigned to the same assignee of the present application.

The method of the present invention combines the advantages of circular files (common to process history products) with the flexibility of data retrieval and update operations which will now be described. The capabilities of the method of the present invention are achieved by a defined data structure and a central software program, also known as and referred to herein as a software package or software module, or more simply module. Those skilled in the art can readily distinguish software module from hardware module from the context of that which is being described, hereinunder.

Figure 3:
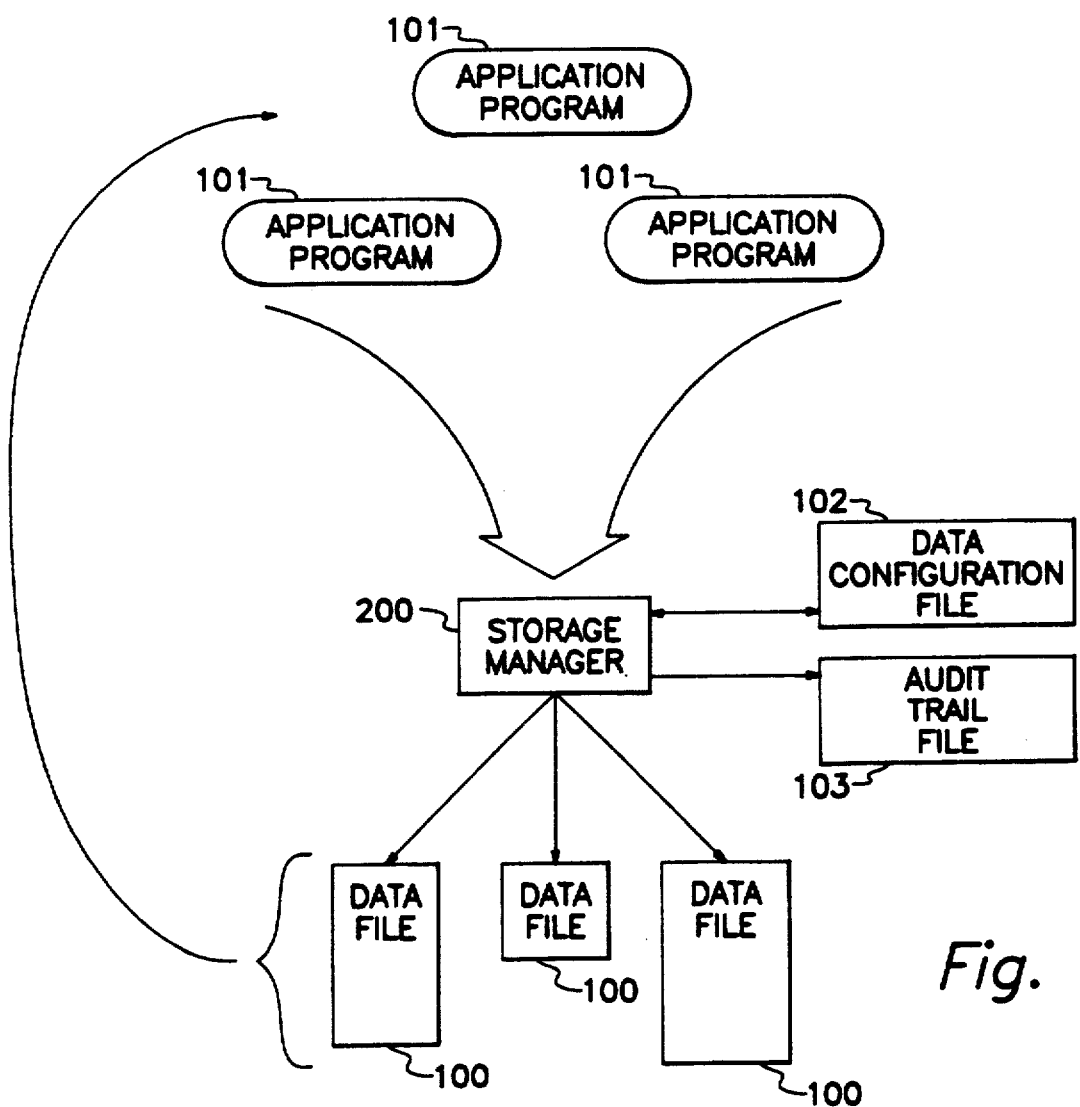
FIG. 3 shows an overview of the software which incorporates the method of the present invention.

Referring to FIG. 3, there is shown an overview of the software which incorporates the method of the present invention. Data files 100 are maintained in a storage device, eg, the disk mass storage device of the history module 16-HM discussed above. The central program, referred to above, is the storage manager 200, which interprets the storage requests made to the storage manager 200 by various application programs 101. Application programs 101, which can be operating in the different modules discussed above, eg, the universal operator station module (US) 16-US, the history module (HM) 16-HM, the application module (AM) 6-AM, ..., do not store directly into the data files 100, but pass storage requests to the storage manager 200 by techniques well known in the art. Application programs 101, can directly access (read) data in the data file 100, opening only those files that contain data needed by the application program 101. The storage manager 200 has associated with it, a data configuration file 102, one configuration file per data file, and an audit trail file 103. The storage manager interprets the storage request using information contained in the associated data configuration file 102. If the data to be stored complies with the definition established in the data configuration file 102, the data processing is executed, file pointers in the data configuration file are updated, and the data is stored in the specific data file 100. If an audit trail option is selected, an audit trail file 103 is created/updated.

Figure 4:
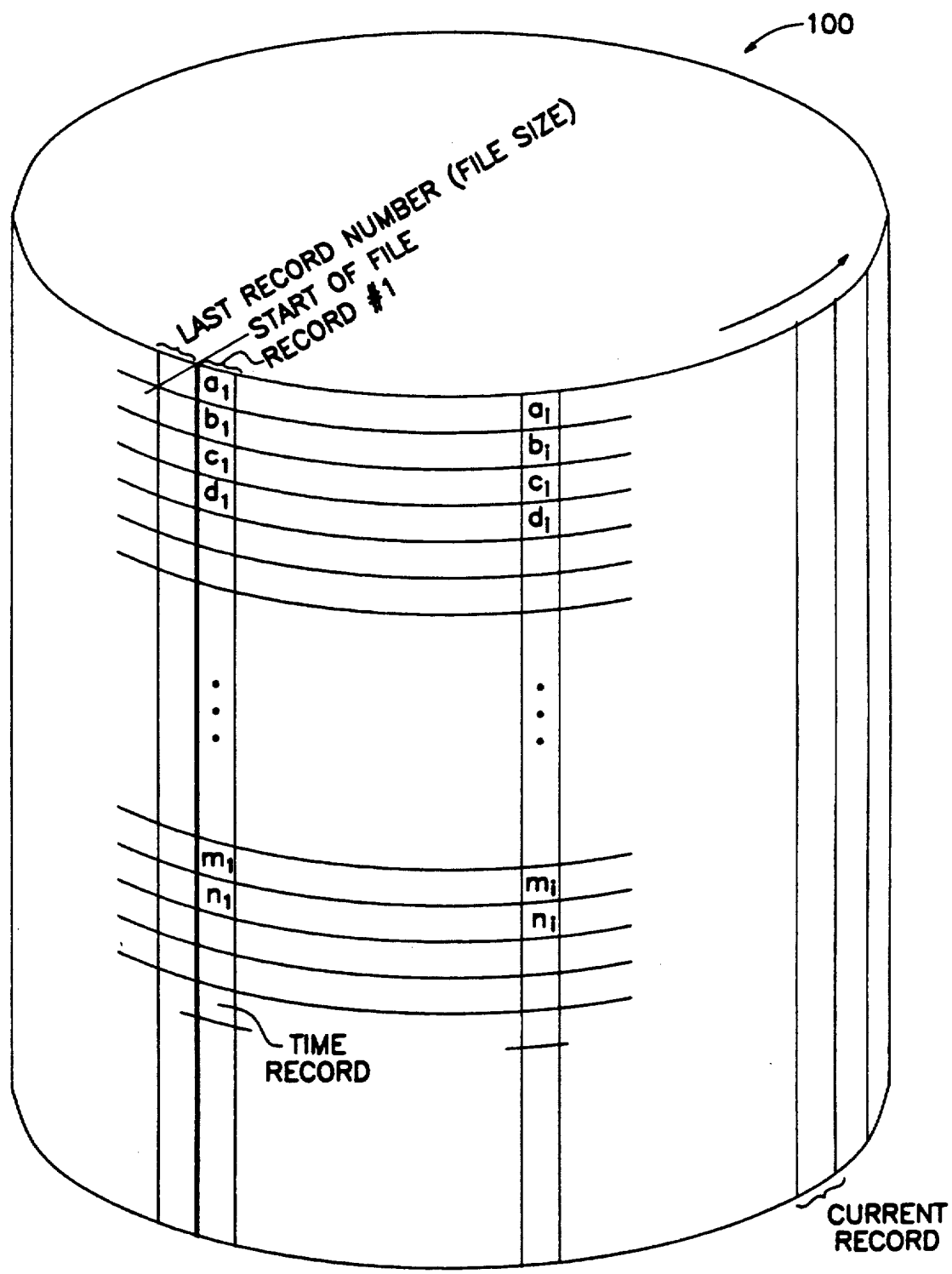
FIG. 4 shows a diagram depicting the basic architecture of a single data file.

Referring to FIG. 4, there is shown a diagram depicting the basic architecture of a single data file 100. Data files are cylindrical in form, i.e. the last record in the file is logically "wrapped" to the first record, sometimes referred to in the art as wrap-around. Thus, after the last record is written into the data file, the next record writes in file number 1. At any moment in time, the new incoming data is written into what is referred to as the current record for the data file 100. The next record to be written into (which will be the new current record) is the adjacent record in a counter-clock-wise direction in accordance with the data structure as shown in FIG. 4. Since each record contains a time stamp, i.e. time information, the time interval between records is not fixed (i.e., cyclic) and therefore can vary. Each record contains a time stamp, therefore the time interval between records can vary. Each data file 100 may have a different current record number. The current record number is maintained in the data configuration file 102 for use by the application programs 101. The number of records, the number of elements in a record, and the format of an individual element is specific for a single data file 100 and is maintained in the data configuration file 102.

The data element a can be, for example, the value of the pressure in pipe X (of the process being performed in the plant), b can be the temperature in vat Y, c can be the flow rate in pipe Z, ... n can be the condition of process events (mode, contact closings, ...), m can be the status of alarm indicators, .... The value of $a_1$, $b_1$, $c_1$, ... is the value/status at the time recorded. A request to capture and store the data can be made by an application program which is requesting periodic inputs; however, the i record and the i+1 record do not necessarily reflect the requests from this first application program 101. Other requests to record the data can be made to the storage manager 200 by other applications 101, such that the requests from the first application program can be reflected by the i record and the i+n record, where $n \geq 2$. In general, since most processes are relatively stable or slow, the frequency of the periodic requests can be relatively small, especially since inputs to record the data are being made from other application programs which record operator inputs, outside (or external) events, and process events. As a result of capturing all these kinds of data, event histories are readily available.

Because of the wrap-around structure, the intervention of the operator is substantially minimized. If an offload option is selected, before the overwrites occur, the data in the data file 100 is archived to some off-line storage device, such as a magnetic tape. However, the latest N records (where N is the size of the total file) are still available to the history module 16-HM, unlike prior systems. Since the data is time stamped, and since the data includes the associated data configuration file 102, the data file 100 is reconfiguration tolerant and is portable across multiple systems.

The audit trail file 103 is maintained by the storage manager. Since there are multiple applications programs 101 which have access to the file, the audit trail file is incorporated into the method of the present invention to record a present status value, if the status is modified, the new status value, when the change occurred, and the requestor application program. This is incorporated in the preferred embodiment of the present invention since an operator, from an operator station, can manually initiate the change. If data is being collected while another request to collect the data is made, the data can be tagged indicating the data may not be valid. In the present invention, the operator can be performing a manual data entry while the "periodic data" is being collected and stored. As mentioned before, requests to store data by the storage manager 200 are queued, thereby permitting these multiple requests to be made.

Previous systems did not permit the entry (storage) of lab data. Lab data is data which is put back into the system sometime later, time-wise, from the time it was collected. For example, assume there is a process which has four (4) chemicals being combined to make a compound. Every hour samples are collected and stored. Further, at the end of every shift, they are chemically analyzed and some record is maintained. In previous systems, the analysis results could only be stored at the end of the data. Thus, the results and the associated data are stored in the data file. In the data structure of the present invention, a field is allocated within the record such that the analysis results can be inserted in the proper field by the operator, i.e., a manual entry of the off-line analysis. In the system of the present invention, if the trending of the lab results is performed against the process variables at the time the data was collected, the trend correlates instead of being skewed.

Statistical processing can occur on-line, by sending the data collected to a statistical manager module, which can be an application program in the application module (AM) 16-AM discussed above. For example, assume every 30 seconds an observation is made (an observation being one data element), and three observations is a sample. From a sample an average is obtained, and plotted. The next three observations yields another sample and an average from these three samples are made, and an average of the samples (i.e., an average of the average) is plotted as a function of time. If, for example, an axiom exists that for this statistical process an ascending slope of the plot is indicative of a statistical alarm, an output alarm indication can be generated to the operator so that corrective action can be taken before an actual process alarm condition exists. In existing systems, after a predetermined quantity of data is collected, the information is analyzed, but by that time a real (process) alarm can exist resulting in the process yielding a bad product. The system of the present invention provides for on-line statistical analysis, the definition of the stages, or slopes of the process to be analyzed on-line and the tolerance allowable are predefined and is a function of the process being monitored. The contents of the storage manager 200, and the contents of the data configuration file 102 is contained in table 1.

TABLE 1

| INFORMATION | DEFINITION |
|---|---|
| STORAGE MANAGEMENT MESSAGE | |
| Sender-Code | Identifies the user sending the message. Special codes specify configuration updates. |
| File-Code | Identifies which data base file is to be affected. |
| Record-number | Identifies record to be updated. Zero (0) indicates new record to be added. |
| Time-Stamp | Identifies when the record was originally created. |
| Status-array | Status information for each field in the record. |
| Value-array | Binary representation of values to be stored in the record. |
| DATA CONFIGURATION FILE | |
| File-name | User name for the file. |
| File-size | Number of records in the data file. |
| Archive-size | Number of records in the On-line Archive File. |
| Record-size | Format of record (number of bytes). |
| Current-pointer | Record number of the most recent record added to the Data File. |
| Update-procedure | Determines if custom procedures are to be executed on record update. |

TABLE 1-continued

| INFORMATION | DEFINITION |
|---|---|
| Auto-Archive | Determines if Data File is copies to on-line Archive at end of each cycle. |

Figure 5A:
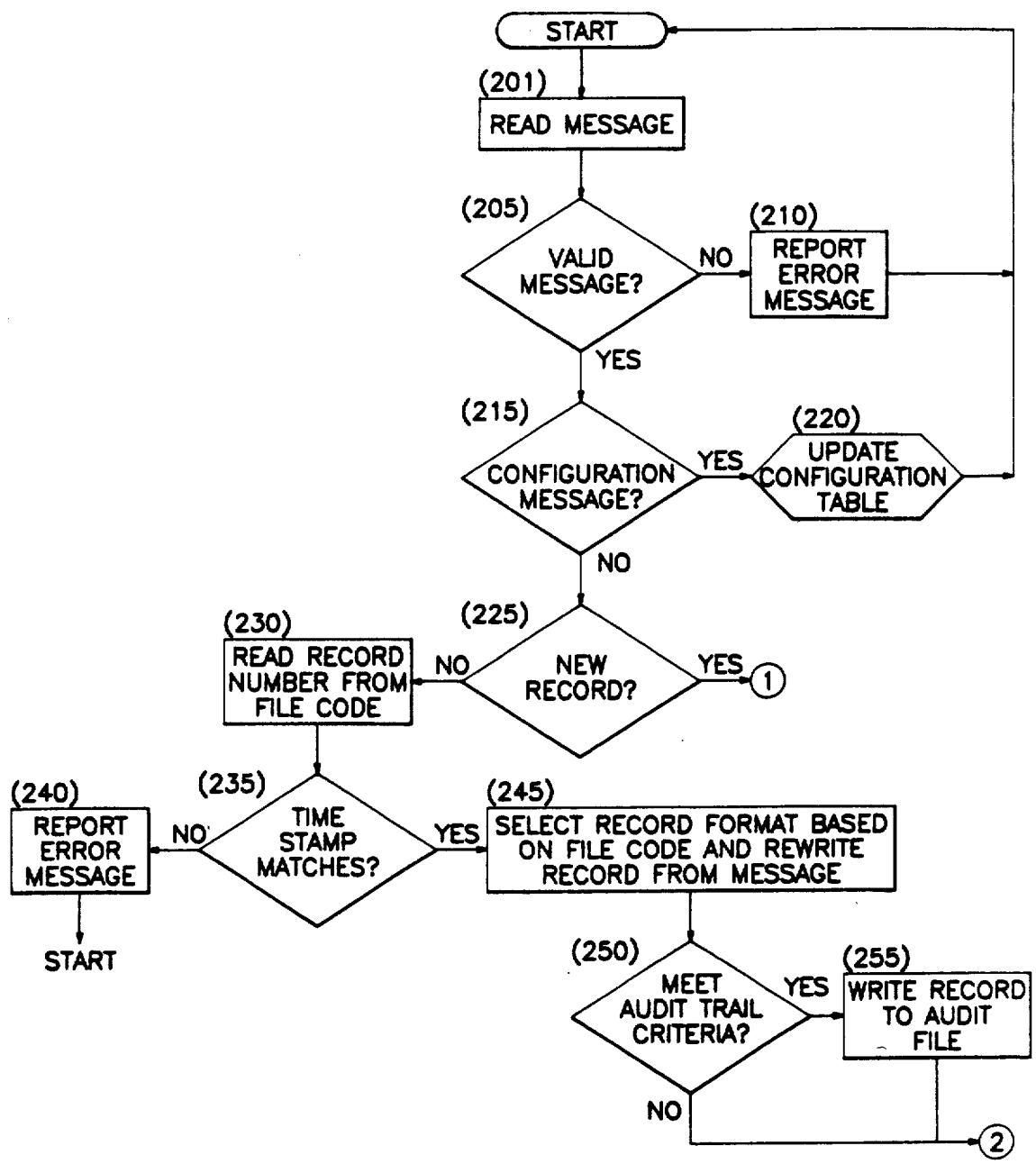
FIGS. 5A and 5B, which taken together comprise
Figure 5B:
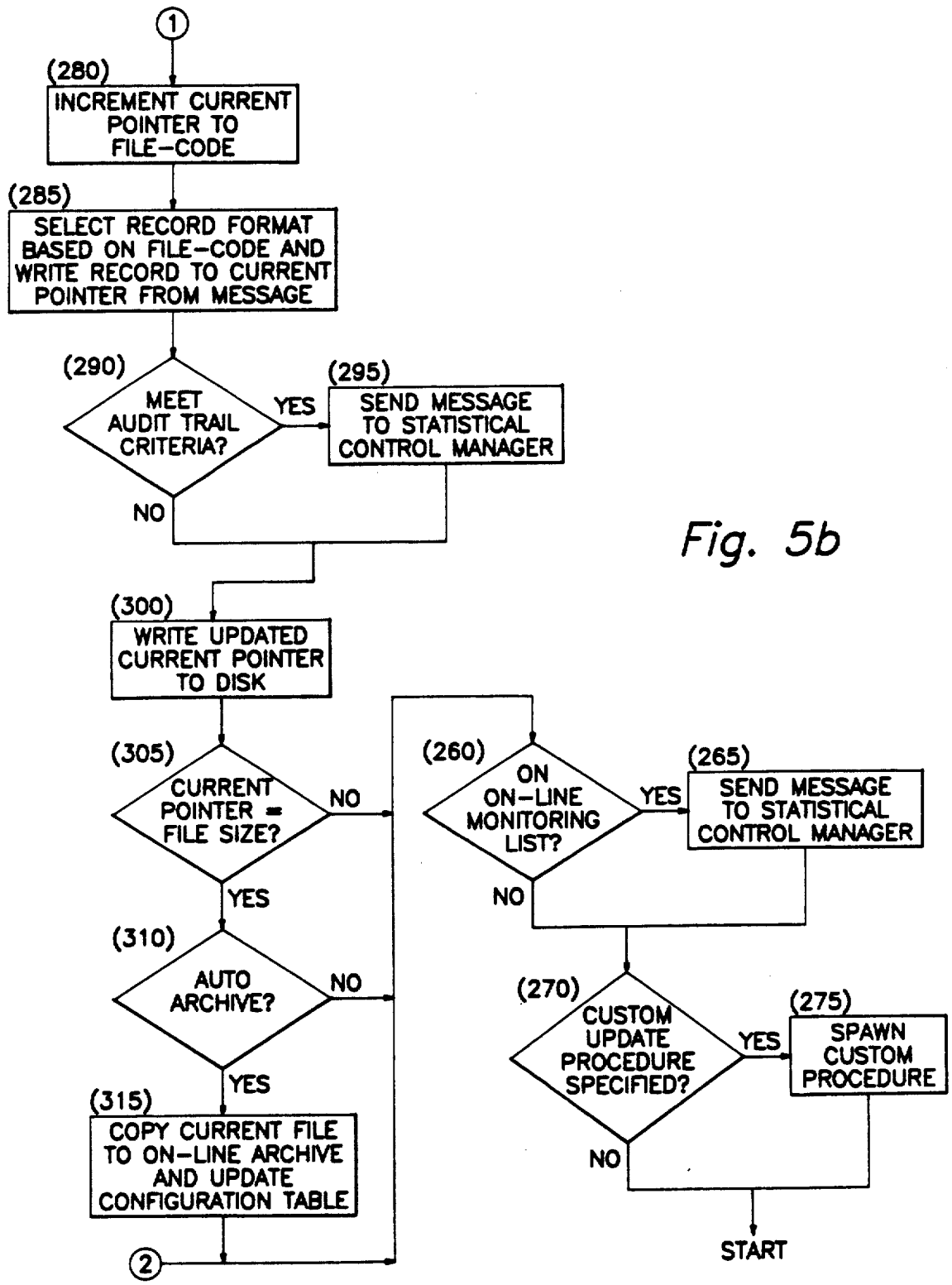

Referring to FIG. 5A and 5B, which together comprise FIG. 5, there is shown the overall flow diagram of the control of the storage manager (software) module 200. Although not shown, the initialization performed by the software manager is not shown but is presumed to have been performed, such as all files have been opened, .... At the start of the processing, the software manager reads the message which has been queued as a result of passing messages from the application modules which are seeking the services of the storage manager 200. If no messages exist, the storage manager is essentially in an idle mode. Upon reading the queued message (block 201), the storage manager decodes the message to insure that the message is valid (block 205). If the message is invalid, the storage manager reports an error message back to the requesting application program via techniques, which are well known to those skilled in the art (block 210). If the message is valid (block 205), the storage manager determines if the message is a configuration message (block 215). If the message is a configuration message (block 215), the storage manager updates the configuration file 102 (block 220), and returns to the start of the control processing of the storage manager. If the message was not a configuration message (block 215), a determination is made to determine if the message is a request for updating the data file with a new data record (block 225). If the message is not a new record message (block 225), indicating that the message contains data which is to be updated in an already existing record in the data file 100, the record is read from the data file 100 and stored in a working area of the storage manager (block 230). In requesting a record to updated, the data requested to be updated is passed to the storage manager module along with a time-stamp of the record to be updated. The storage manager compares the time-stamp of the record requested, i.e., the record just read from the data file 100, to the time-stamp contained in the data to be updated which has been passed from the application program 101 (block 235) If the time-stamp does not match an appropriate error message (block 240) is generated by the storage manager and passed back to the requesting application program (block 240). The process then continues at the start point and continues to read messages (block 201) queued for processing by the storage manager.

If the time-stamp matches (block 235), the data which was requested to be updated by the application program 101 is updated into the record selected by the application program in accordance with the format and/or structure specified in the associated data configuration file 102 (block 245). After the record has been updated, the various options are checked to determine whether they are in effect. If the audit trail option has been selected (block 250), a record is written to the audit file, which contains information such as the status or value of the previous information, the new information just written, the requesting application program, and other information required in order to maintain an adequate audit (block 255). After the audit record has been written (block 255), or if the audit option was not selected (block 250), the storage manager determines if an on-line monitoring list option has been selected (block 260). If the on-line monitoring list has been selected, a message is passed to the statistical control manager module (block 265). Upon completing the monitoring list processing (block 260 and 265), the storage manager determines if a custom update procedure has been specified (block 270). If a custom update procedure has been specified, the specified procedure is performed (block 275), and the software manager than proceeds back to the start point to repeat the processing. If the custom update procedure has not been specified (block 270), the software manager again branches to the start point and repeats the processing. The updating of a record already stored in the data file 100 (block 245), is essentially a data processing function in the updating of data elements associated with a record which has already been written, and includes the operator input or manual entry part of maintaining/updating the data base (or data elements of a record within the data structure).

If the message passed to the storage manager indicates a new record is to be written (block 225), the storage manager proceeds to update the data file as specified by the application program 101. A pointer which indicates the current record is incremented, the data configuration file 102 is obtained corresponding to the data file 100 which is to be written, and the data is configured, and the record is written in the data file in accordance with the instruction of the message (blocks 280, 285). After the record has been updated, the software manager determines if the audit option has been selected (block 290), and if the audit option has been selected, an appropriate message is passed to the statistical control manager (block 295). If the audit trail has not been selected, or after the message has been passed to the statistical manager, the storage manager performs some housekeeping, including writing the updated current record pointer into the storage device thereby maintaining current control information (block 300). If the current pointer has a value corresponding to the file size (block 305), the storage element, i.e., disk, memory, ...., is full, and if the data is to be archived (block 310), the complete data file 100 is copied to an on-line archive and the configuration table is updated (block 315). If the value of the current pointer does not equal the file size, indicating the storage element is not full, or if the auto archive option has not been selected, or after the current data file has been archived to an on-line memory unit, the processing continues to determine if the on-line monitoring option has been selected (block 260).

The processing of blocks 280 and 285 essentially comprise the processing of data from a cyclical data, i.e., being requested by an application program which is controlling or performing the cyclical request and doing the reads of the data from the appropriate sources, including the process data, status data of the network 14 or the system 5, external events, .... The storage manager does incorporate the classical data processing approach to gathering and storing data with a data base maintenance environment, and incorporates the control necessary to perform the on-line monitoring and initiating on-line statistical analysis. In addition to the normal hardware protection well known to those skilled in the art, by only permitting the software manager to update, i.e., perform the writes to the data files 101, the data is effectively software protected.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

We claim:

1. In a process control system for controlling a plant process, said process control system having a network which includes a plurality of modules, each module performing a predetermined function independent of each other, the modules including at least one history module, and at least one application module, said modules being linked via a medium such that each module can communicate with every other module of the network, said network interfacing with a control subsystem which interfaces with control elements of the plant process, the control elements having associated therewith process data, wherein the process data includes data values and event data, and wherein total data includes process data, data calculated from the process data, off-line data, and external data, and further wherein each module operates independently of each other on at least one predetermined data set associated therewith, wherein each data set includes predetermined data from the total data which is shared in other predetermined data sets and which is unique within the data set, said data sets of each module being stored in a storage device of said history module in response to a request from any of the modules, there being included a software control module which coordinates the requests from the modules and controls the writing of the data sets in the storage device such that any of said modules desiring to write any data makes requests to said software control module via messages, said messages being queued by said software control module, wherein said requests by each of said modules are inputted asynchronously to said software control module, and wherein said message includes data and information identifying the data set including data set identifier, new/update command, time, record number, and validation code, each predetermined data set having a corresponding logical data file allocated in said storage device, a method for managing the data files comprising the steps of:

a) queuing the messages received from said modules;

b) processing the messages to determine if a new record is to be written in said storage device, said processing being performed by the software control module, and if a new record is to be written, proceeding to step (c), otherwise proceeding to step (d);

c) writing the new record in a next available adjacent logical record of the data file specified in the message, said record including the predetermined data of the data set, and further wherein said new record having added thereto time data indicating the real time of said process data of said new record, then proceeding to step (e);

d) updating the record requested via the message with the selected portions of said data set as specified by the message; and e) repeating the processing, beginning at step (a).

2. A method for managing the data files according to claim 1, wherein the process control system includes an on-line archive file, and wherein the method further comprises the steps of:

a) after the writing the new record step, step (c) of claim 1, determining if the storage device is full;

b) if the storage device is full, copying the data files of the storage device onto the on-line archive file; and c) initializing the status information in the file which indicates the status of the data files on the storage device, the initialization causing the next new record to be written to overlay the oldest record, thereby achieving a wrap-around storage file for the data files of the storage device.

3. In a process control system for controlling a plant process, said control system having a network which includes a plurality of modules, each module performing a predetermined function independent of each other, the modules including at least one history module, and at least one application module, said modules being linked via a medium such that each module can communicate with every other module of the network, said network interfacing with a control subsystem which interfaces with control elements of the plant process, the control elements having associated therewith process data, wherein the process data includes data values and event data, and wherein total data includes process data, data calculated from the process data, offline data, and external data, and further wherein each module operates independently of each other on at least one predetermined data set associated therewith, wherein each data set includes predetermined data from the total data which is shared in other predetermined data sets and which is unique within the data set, said data sets of each module being stored in a storage device of said history module in response to a request from any of the modules, there being included a software control module which coordinates the requests from the modules and controls the writing of the data sets in the storage device such that any of said modules desiring to write any data makes requests to said software control module via messages, said messages being queued by said software control module, wherein said requests by each of said modules are inputted asynchronously to said software control module, and wherein said message includes data and information identifying the data set including data set identifier, new/update command, time, record number, and validation code, each predetermined data set having a corresponding logical data file allocated in said storage device, a method for managing the data files comprising the steps of:

a) queuing the messages received from said modules;

b) processing the messages to determine if a new record is to be written in said storage device, said processing being performed by the software control module, and if a new record is to be written, proceeding to step (c), otherwise proceeding to step (f);

c) reading a configuration file identified by the message from the storage device which defines the data configuration of the data file and includes status information about the data file;

d) writing the new record in a next available adjacent logical record of the data file specified in the message, said record including the predetermined data of the data set, and further wherein said new record having added thereto time data indicating the real time of said process data of said new record;

e) writing updated status information in the corresponding status file to indicate the new status of the data file including information pertaining to the new record which was written in step (d), then proceeding to step (g);

f) updating the record requested via the message with the selected portions of said data set as specified by the message; and g) repeating the processing, beginning at step (a).

4. A method for managing the data files according to claim 3, wherein the step of updating comprises the steps of:

(a) reading the configuration file identified by the message from the storage device which defines the data configuration of the data file;

b) reading the record of the data file identified in the message requesting the update;

c) inserting the data specified in the message into the data location of the record and having a format defined by the configuration file which defines the data configuration; and d) writing the updated record of the data file back onto the storage device into the location of the storage device the data file occupied in step (b).

5. A method for managing the data files according to claim 4, wherein the step of reading the record of the data file comprises the steps of:

a) reading the record of the data file identified in the message requesting the update; and b) verifying that the time-stamp contained in the record of the data file corresponds to the record of the data file specified to be updated in said message.

6. A method for managing the data files according to claim 5, whereby the software control module includes a selectable audit trail option having an audit trail file, wherein the method further comprises the steps of:

a) after the step of updating the record requested via the message determining if the audit trail option has been selected; and b) if the audit trail option is selected, writing predetermined data to an audit trail file corresponding to the updated data file.

7. A method for managing the data files according to claim 6, wherein the method further comprises the steps of:

a) after determining if an audit trail option is selected, and writing predetermined data to the audit trail file, determining if a monitoring option is selected; and b) if the monitoring option is selected, passing a message to a statistical control module which includes information about the data which has been updated.

8. A method for managing the data files according to claim 7, wherein the method further comprises the steps of:

a) after the step of writing the new record, determining if the audit trail option is selected; and b) if the audit trail option is selected, passing a message to the statistical control module which includes predetermined data.

9. A method for managing the data files according to claim 8, wherein the process control system includes an on-line archive file, and wherein the method further comprises the steps of:

a) after the passing step determining if the storage device is full;

b) if the storage device is full, copying the data files of the storage device onto the on-line archive file; and c) initializing the status information in the file which indicates the status of the data files on the storage device, the initialization causing the next new record to be written to overlay the oldest record, thereby achieving a wrap-around storage file for the data files of the storage device.

* * * * *